United States Patent [19]

Halma et al.

[11] Patent Number: 5,907,684
[45] Date of Patent: *May 25, 1999

[54] INDEPENDENT CHANNEL COUPLED TO BE SHARED BY MULTIPLE PHYSICAL PROCESSING NODES WITH EACH NODE CHARACTERIZED AS HAVING ITS OWN MEMORY, CPU AND OPERATING SYSTEM IMAGE

[75] Inventors: Marten Jan Halma, Poughquag, N.Y.; Martin William Sachs, Westport, Conn.

[73] Assignee: International Business Machines Corporation, Armonk, N.Y.

[*] Notice: This patent is subject to a terminal disclaimer.

[21] Appl. No.: 08/652,177

[22] Filed: May 23, 1996

Related U.S. Application Data

[63] Continuation-in-part of application No. 08/261,641, Jun. 17, 1994, Pat. No. 5,522,088.

[51] Int. Cl.[6] .................................................. G06F 13/00
[52] U.S. Cl. ...................................... 395/200.67; 395/892
[58] Field of Search .................................... 711/202, 201; 395/856, 848, 881, 200.43, 674, 200.67, 892

[56] References Cited

U.S. PATENT DOCUMENTS

| | | | |
|---|---|---|---|
| 3,693,161 | 9/1972 | Price et al. | 340/172.5 |
| 4,014,005 | 3/1977 | Fox et al. | 340/172.5 |
| 4,562,533 | 12/1985 | Hodel et al. | 364/200 |
| 4,564,903 | 1/1986 | Guyette et al. | 711/201 |
| 4,821,170 | 4/1989 | Bernick et al. | 364/200 |
| 4,980,822 | 12/1990 | Brantley, Jr. et al. | 711/202 |
| 5,191,651 | 3/1993 | Halim et al. | 395/200 |
| 5,297,260 | 3/1994 | Kametani | 395/325 |
| 5,297,262 | 3/1994 | Cox et al. | 395/856 |
| 5,331,315 | 7/1994 | Crosetto | 340/825.02 |
| 5,388,217 | 2/1995 | Benzschawel et al. | 395/275 |
| 5,414,851 | 5/1995 | Brice, Jr. et al. | 395/674 |
| 5,452,455 | 9/1995 | Brown et al. | 395/653 |
| 5,463,736 | 10/1995 | Elko et al. | 395/848 |
| 5,522,088 | 5/1996 | Halma et al. | 395/881 |
| 5,561,809 | 10/1996 | Elko et al. | 395/200.43 |

OTHER PUBLICATIONS

Robert A. Peck, "Expanding Your Apple's Applications", Dec. 1984, pp. A45–A47, A122–A126.

Primary Examiner—Thomas C. Lee
Assistant Examiner—David Ton
Attorney, Agent, or Firm—Lawrence D. Cutter; Lynn L. Augspurger; Heslin & Rothenberg PC

[57] ABSTRACT

A computer system and processing method are provided for coupling multiple physical processing nodes together, wherein each physical processing node is characterized as having its own memory, by either at least one channel which is independent of and coupled to the multiple physical processing nodes or by at least one input/output (I/O) processor, again which is independent of and coupled to the multiple physical processing nodes. The at least one channel and/or the at least one I/O processor couple the multiple physical processing nodes to at least one shared input/output device. Sharing of the at least one channel and/or at least one I/O processor is practical by providing "indirect logical addressing" using logical address tables within the channel subsystem. The logical address tables associate an image identifier (Image_ID) and processing node identifier (PN_ID) concatenation with an indexed logical address for use in communicating I/O operation parameters across the at least one channel.

29 Claims, 6 Drawing Sheets

INDEPENDENT CHANNEL COUPLED TO BE SHARED BY MULTIPLE PHYSICAL PROCESSING NODES WITH EACH NODE CHARACTERIZED AS HAVING ITS OWN MEMORY, CPU AND OPERATING SYSTEM IMAGE

CROSS-REFERENCE TO RELATED APPLICATION

The present patent application comprises a continuation-in-part of commonly assigned U.S. patent appplication Ser. No. 08/261,641, filed Jun. 17, 1994 entitled "Shared Channel Subsystem Has a Self Timed Interface Using A Received Clock Signal To Individually Phase Align Bits Received From a Parallel Bus," now U.S. Pat. No. 5,522,088, which is hereby incorporated herein by reference in its entirety.

TECHNICAL FIELD

This invention relates in general to input/output (I/O) operation processing within a data processing system, and in particular, to the transfer of I/O operation information between a physical processing node, of multiple distinct nodes coupled together in a computer system, and an I/O device, employing a shared I/O subsystem comprising at least one of a shared channel subsystem and a shared input/output (I/O) processor. Each physical processing node of the computer system is characterized as having its own main memory.

BACKGROUND ART

In a coupled systems complex with many physical processing nodes, for example, each comprising International Business Machines' System/390 parallel transaction server, the cost of input/output (I/O) connectivity between the different processors and their shared I/O devices is a significant component of the total computer system cost. Today, each processor has its own dedicated I/O subsystem structure, including its own channel subsystem with at least one channel connecting the processor to one or more of the shared I/O devices. Configuring enough channels, control unit adapters and (for IBM System/390-like systems) switches for full connectivity, results in using a much larger number of channels, control unit adapters, and switches than otherwise needed for performance and availability. A separate channel is required for each processing node, and switching (or multiple adapters at the control unit) is required to enable each processing node to communicate with a control unit connected to a desired input/output device.

In a conventional data processing system architecture, such as International Business Machines' Enterprise Systems Architecture/390, information is passed between main storage and input/output devices via a processor's dedicated channel subsystem. The channel subsystem uses one or more channel paths, each including a channel and one or more control units and serial links, as the communication links between its main storage and the input/output devices. The writing of data from main storage to input/output devices or the reading of data from input/output devices to main storage is accomplished by executing input/output operations. The execution of input/output operations is accomplished by the decoding and executing of channel command words by the channel subsystem and input/output devices.

As used herein, the phrase "physical processing node" comprises a processor having its own main storage or memory which is separate from and not accessible by other physical processing nodes in a computer system comprising a plurality of physical processing nodes. Conventionally, each physical processing node has its own channel subsystem and I/O processor(s) coupling its main storage to the shared I/O devices of the coupled systems complex.

There exists a need in the art for a computer system architecture and data processing approach which allow multiple physical processing nodes to obtain full connectivity to I/O devices using a smaller number of channels, control unit adapters, and switches, while still meeting performance and availability objectives.

DISCLOSURE OF INVENTION

Briefly described, the present invention comprises in one aspect a computer system having multiple physical processing nodes coupled together. The processing nodes are characterized as having their own memory. At least one channel is independent of and coupled between the multiple physical processing nodes and at least one I/O device such that the at least one channel is shared by the multiple nodes for accessing of the at least one I/O device. Novel addressing means are also provided for sharing the at least one channel between the multiple physical processing nodes such that I/O operations initiated at different nodes can each take place over the at least one channel.

In another aspect, the invention comprises a computer system having multiple physical processing nodes coupled together, each processing node being characterized as having its own memory and lacking its own I/O processor. At least one shared input/output (I/O) processor is independent of and coupled to the multiple physical processing nodes and to at least one I/O device. Novel addressing means are also provided for sharing the at least one I/O processor between the multiple physical processing nodes such that parameters associated with different I/O operations initiated at different processing nodes can all be processed through the at least one I/O processor.

Processes corresponding to the above-outlined computer systems are also described and claimed herein.

In all aspects, addressing in accordance with the present invention employs a concatenation of an image identifier (Image_ID) and a physical processing node identifier (PN_ID). These identifiers are provided with initiation of each I/O operation at a physical processing node of the multiple nodes commonly connected to the independent but shared I/O subsystem. In order to accommodate a large coupled systems complex, the present invention employs indirect addressing within the I/O subsystem when transferring I/O parameters. This indirect addressing is achieved through the provision of logical address tables within the I/O subsystem from which an indexed logical address can be obtained, e.g., dynamically, at time of processing an I/O operation. The indexed logical address is employed for communicating I/O operation parameters across a channel of the subsystem.

By sharing the I/O subsystem, and in particular the I/O processor and/or channel subsystem, the present invention achieves a reduction in the cost of connectivity by reducing excess paths previously required to couple multiple processing nodes to shared I/O devices. With this invention, each processing node may contain an I/O processor coupled to the shared I/O subsystem or the I/O processors may be connected between the switch of the coupled systems complex and the shared channels, thereby enabling the I/O processors to also be shared by the processing nodes. Full connectivity is attained using a smaller number of channels, control unit adapters and switches, while still meeting performance and availability objectives. Further advantages include a reduction in the size and number of switches required between the physical processing nodes and the shared I/O devices since a single switch may provide connectivity for any physical processing node to any channel of the shared subsystem.

BRIEF DESCRIPTION OF DRAWINGS

The subject matter which is regarded as the present invention is particularly pointed out and distinctly claimed in the concluding portion of the specification. The invention, however, both as to organization and methods of practice, together with further objects and advantages thereof, may best be understood by reference to the following detailed description taken in conjunction with the accompanying drawings in which:

FIG. 2a depicts one embodiment of logical address tables for converting a concatenated image identifier (Image_ID) and processing node identifier (PN_ID) into an indexed logical address in accordance with the present invention, while FIG. 2b depicts one embodiment of a logical address table for reconverting an indexed logical address into the corresponding node and image identifiers;

BEST MODE FOR CARRYING OUT THE INVENTION

Figure 1:
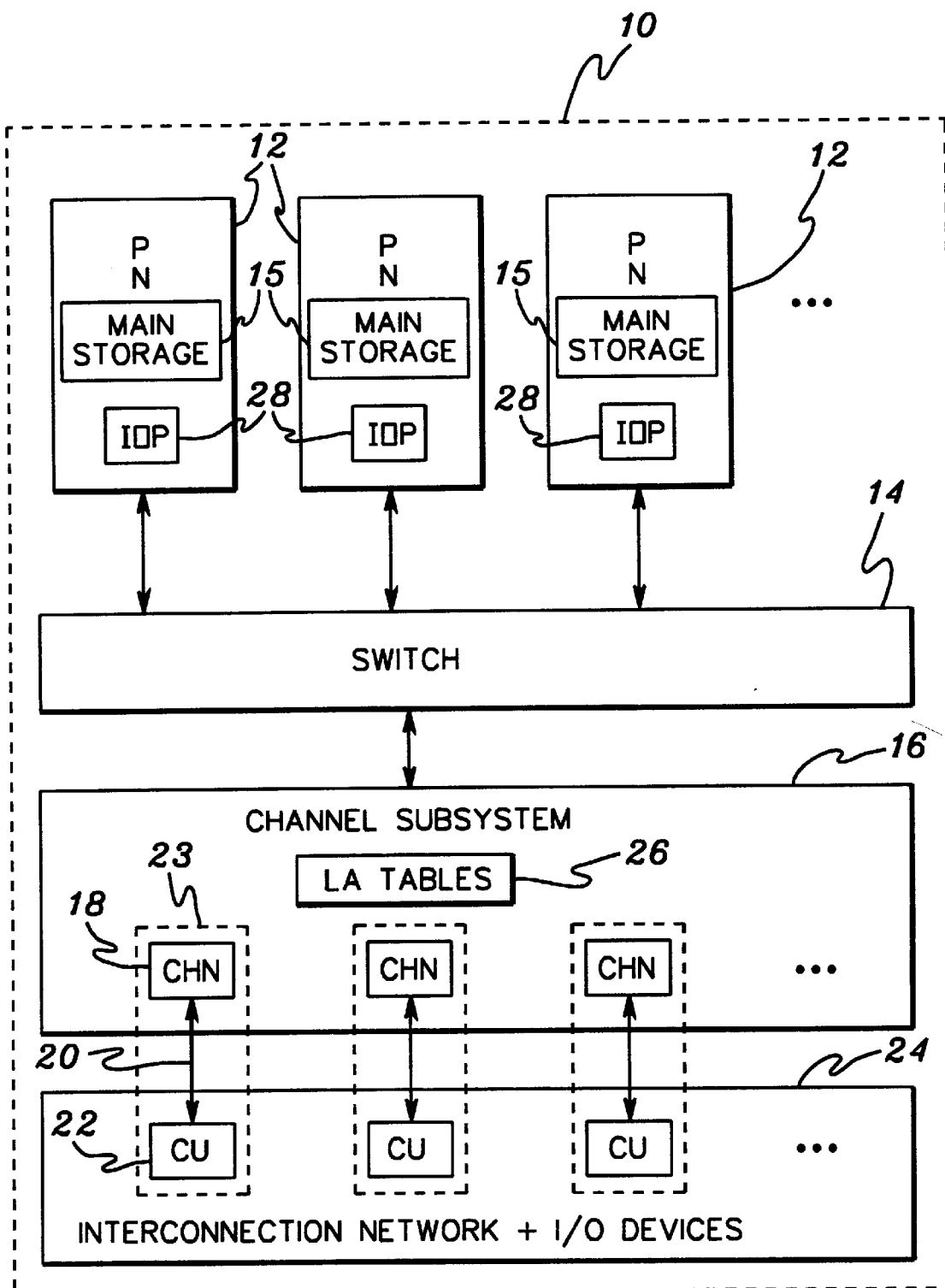
FIG. 1 depicts a block diagram of one example of a computer system in accordance with the present invention.

FIG. 1 is one example of a computer system, generally denoted 10, in accordance with the present invention. System 10 includes multiple physical processing nodes 12 coupled together by means of a switch 14. Input/output operations from each physical processing node 12 are communicated through switch 14 and an independent but commonly shared channel subsystem 16 which has multiple channels 18 linked 20 to control units (CUs) 22 of an interconnection network with multiple input/output (I/O) devices 24. Each of these system 10 components is explained below.

Physical processing node 12 includes, for instance, a main storage 15, one or more central processing units (CPUs) (not shown), along with a storage control element (not shown). Conventionally, a channel subsystem is also required for each physical processing node. However, with the present invention these structures (16) are not dedicated to particular physical processing nodes, but rather, are coupled to be shared among the different processors in the computer system. A novel indirect addressing approach is discussed hereinbelow for allowing processing nodes 12 to access I/O devices across the links 20 coupling the shared channel subsystem 16 to the interconnection network and I/O devices 24.

Again, in a computer system in accordance with this invention, each processing node 12 is distinguished as having its own main storage 15 which is separate from and not accessible by other processing nodes in the system. Within each node, main storage 15 is directly addressable and provides for high-speed processing of data by the central processing unit(s) within the node, and by the shared channel subsystem 16. In one example, main storage 15 may include a customer storage area and a system area (not shown). The central processing unit(s) within each node 12 comprises the controlling center of computer system 10. This unit(s) contains the sequencing and processing facilities for instruction execution, interruption action, timing functions, initial program loading, and other machine-related functions. Each central processing unit within a node 12 is coupled to the node's storage control element (not shown) via a bidirectional bus or a unidirectional bus. This storage control element controls, for example, the queuing and the execution of requests made by the central processing units and the external, shared channel subsystem 16.

Figure 3:
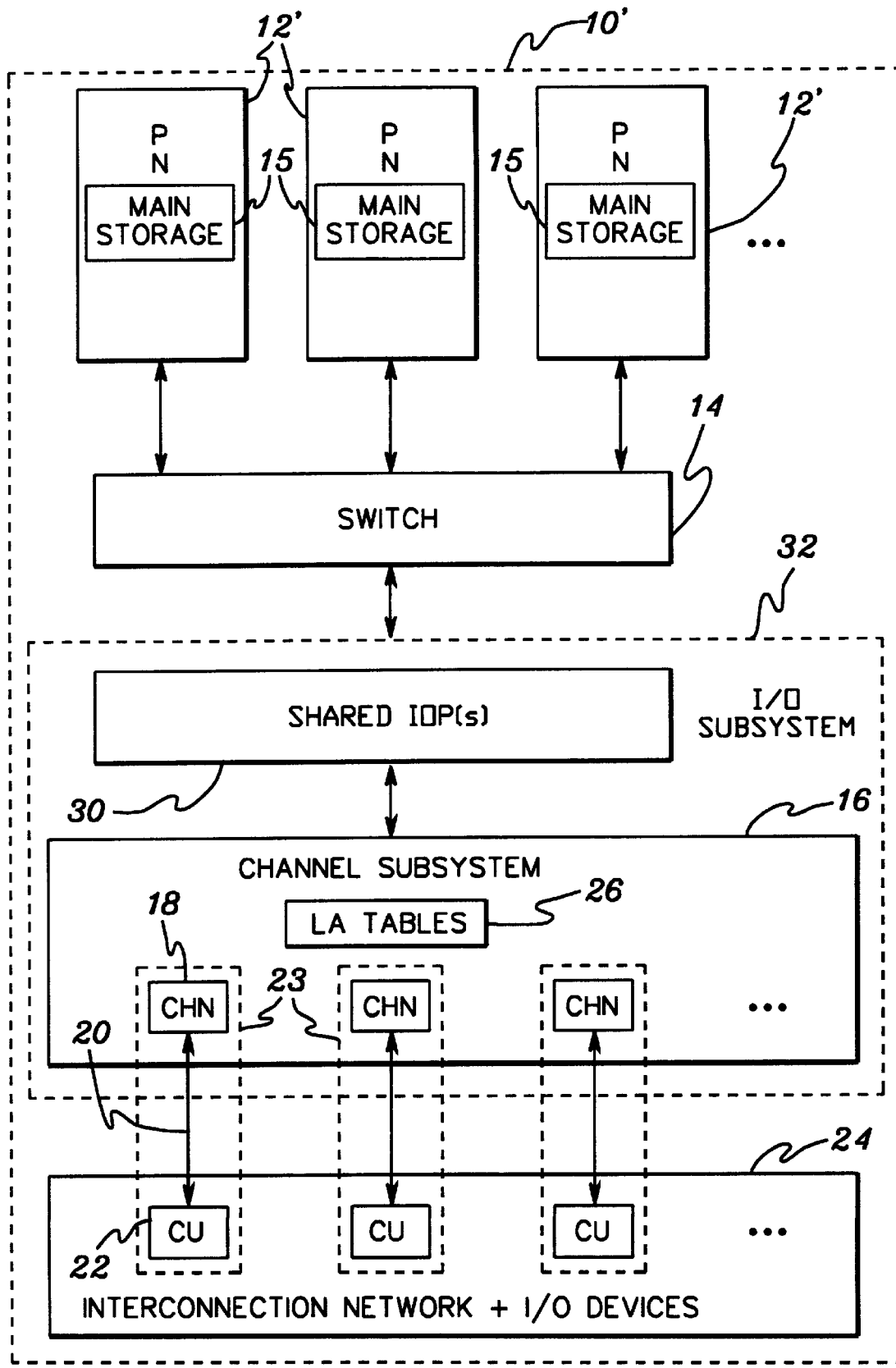
FIG. 3 depicts a block diagram of an alternate embodiment of a computer system in accordance with the principles of the present invention.

In a system similar to the ES/9000 processor, each processing node contains one or more input/output processors (IOPs), each of which manages a group of channels according to the ESA/390 I/O architecture. In the embodiment of FIG. 1, each node 12 is assumed to contain at least one IOP 28, which in turn is connected to switch 14. (FIG. 3 presents an alternate embodiment wherein at least one shared IOP is employed between the switch and channel subsystem, thereby allowing the IOPs to also be removed from the individual processors 12.)

Shared channel subsystem 16 is coupled to each different processing node 12 via the switch 14, and to the interconnection network and I/O devices via one or more serial links 20. Switch 14 comprises a coupled system complex (CECPLEX) switch. Either a circuit switch or a packet switch may be employed. As a specific example, the Self-Timed Interface (STI) switch described in the above-incorporated co-pending application may be employed.

Channel subsystem 16 directs the flow of information between I/O devices 24 and processing nodes 12. It relieves the central processing units within processors 12 of the task of communicating directly with the I/O devices and permits data processing to proceed concurrently with I/O processing. The channel subsystem uses one or more channel paths 23 as the communication links in managing the flow of information to or from I/O devices 24. As part of the input/output processing, channel subsystem 16 also performs the path-management function of initiating execution of the desired operation with the input/output device.

Each channel path 23 consists of a channel 18 (channels 18 are located within channel subsystem 16), one or more control units 22 and one or more serial links 20. (In another example, it is also possible to have one or more dynamic switches as part of the channel path. A dynamic switch, such as an ESCON director switch described in the above-incorporated co-pending application, is coupled to a channel and a control unit and provides the capability of physically interconnecting any two links that are attached to the switch.)

Also located within channel subsystem 16 are subchannels (not shown). One subchannel is provided for and dedicated to each input/output device accessible to the subchannel system. A subchannel provides the logical appearance of a device to the program. Each subchannel provides information concerning the associated input/output device 24 and its attachment to channel subsystem 16. The subchannel also provides information concerning input/output operations and other functions involving the associated input/output device. The subchannel is the means by which channel subsystem 16 provides information about associated input/output devices 24 to processing nodes 12, which obtain this information by executing input/output instructions. The subchannel consists of internal storage that contains the information in the form of a channel command word address, channel path identifier, device number, count, status indications, and input/output interruption subclass code, as well as information on path availability and functions pending or being performed.

Input/output operations are initiated with device 24 by executing input/output instructions at the processing nodes that designate the subchannel associated with the device. Each control unit 22 within interconnection network and I/O devices 24 provides the logic to operate and control one or more input/output devices and adapts, through the use of common facilities, the characteristics of each input/output device to the link interface provided by the channel. The common facilities provide for the execution of input/output operations, indications concerning the status of the input/output device and control unit, control of the timing of the data transfer over the channel path and certain levels of input/output device control.

Each control unit 22 is attached via a bus (not shown) to one or more input/output devices. In one embodiment, each control unit may be attached to up to 256 input/output devices. Input/output devices 24 receive information from or send information to main storage of one of the processing nodes 12. Examples of input/output devices include card readers and punches, magnetic-tape units, direct-access storage, displays, keyboards, printers, teleprocessing devices, communication controllers and sensor-based equipment.

Input/output operations are initiated and controlled by, for instance, a START SUBCHANNEL instruction and channel command words. The START SUBCHANNEL instruction, as well as channels, control units and channel command words associated with International Business Machines Enterprise Systems Architecture, are described in detail in "IBM Enterprise Systems Architecture/390 Principles of Operation," Form No. SA22-7201, which is hereby incorporated herein by reference in its entirety. In addition, communication between channels and control units is described in detail in "Enterprise Systems Architecture/390 ESCON I/O Interface," Form No. SA22 -7202, which is also incorporated herein by reference in its entirety. Forms SA22-7201 and SA22-7202 describe systems operating in accordance with architectures available from International Business Machines Corporation under the trademarks "Enterprise Systems Architecture/390," "ESA/390" and "ESCON."

A START SUBCHANNEL instruction is executed by a CPU within a processing node 12, and is part of the central processing unit program that supervises the flow of requests for input/output operations from other programs that manage or process the input/output data. When a START SUBCHANNEL instruction is executed, parameters are passed to the target subchannel requesting that channel subsystem 16 perform a start function with the input/output device associated with the subchannel. The channel subsystem performs the start function by using information at the subchannel. Once a device is selected, execution of an input/output operation is accomplished by the decoding and executing of a channel command word by channel subsystem 16 and input/output device 24. The channel command word specifies the command to be executed and one or more channel command words arranged for sequential execution form a channel program. Both instructions and channel command words are fetched from main storage 15 within the originating processing node (12).

In one embodiment, START SUBCHANNEL instruction comprises an "S" format instruction which denotes an operation using an implied operand and main storage. This START SUBCHANNEL instruction includes an operation code (OP CODE) which specifies the operation to be performed; a first operand, which is an implied operand located in a first general register (which contains the subsystem identification word designating the subchannel that is to be started); and a second operand, the address of which is the conventional logical address of an operation request block. For further discussion of standard implementation of an I/O operation, reference commonly assigned pending patent application Ser. No. 07/988,549, entitled "Method and System for Pipelining the Processing of Channel Command Words," attorney docket No. PO9-91-063, now U.S. Pat. No. 5,526,484, which is hereby incorporated herein by reference in its entirety.

Since in accordance with the principles of the present invention the channels are being shared by multiple distinct processing nodes and, possibly by different partitions within each processing node, there are multiple system images which may share the channels. Therefore, it is necessary to identify in the messages which flow between the channels and the control units, which processing node and which system image initiated that operation. Because a channel is being shared by multiple processing nodes and system images, the fixed length fields of the logical addressing information might in some systems be insufficient. In general, in any communications architecture, there exists a limited number of "logical entities" using a fixed length field. Fields are normally fixed to attain a high performance implementation. In ESCON architecture, logical paths can be identified by a physical address and a four-bit logical address field.

Thus, the present invention assumes that there is a limited field available for transfer of logical path information on a given channel path. Further, this limited field size is in practice less than the number of bits required to identify a processing node and system image originating a given I/O operation in the coupled systems complex. The solution presented herein is to employ a table or multiple tables (which are referred to herein as logical address tables 26) to indirectly provide the logical address. The table contains the full identifier received from a processing node and the conversion thereof into a four-bit "indexed logical address" for transmission on a given channel path. Essentially the indexed logical address comprises a pointer into the logical address table which contains the actual image identifier concatenated with the process node identifier at the channel end of the link in a channel path. If desired, tables could also be employed in association with the control units to allow the control units to use the indexed logical address to effectively partition themselves.

In accordance with the present invention, each system image is identified by a combination of an image identifier (Image_ID) and a processing node identifier (PN_ID), i.e., Image_ID||PN_ID. In existing System/390 architecture, the Image_ID comprises a four-bit quantity carried in the logical address field of the transmission frames which comprise the ESCON I/O protocol. In a large coupled systems complex (CECPLEX), allowing for future growth of parallel processing techniques (and hence a larger number of processing nodes in the CECPLEX), the existing logical address field will be insufficient for implementation of the shared subchannel concepts presented herein. Although presently possible to provide a larger logical address field, no reasonable field size is likely to remain sufficient for more than a few years. Therefore, the preferred embodiment of the present invention is to implement the logical address indirectly and allow the Image_ID and PN_ID to be implementation dependent, and not exposed architecturally.

As noted, in ESCON I/O, a logical path is an association between a system image, a channel and a control unit adapter. Every I/O operation takes place on a logical path. Whenever a logical path is created in accordance with this invention, the channel dynamically assigns a value to the logical address and associates it with the actual Image ID||PN_ID. Because of this association, the logical address is referred to herein as an "indexed logical address." The indexed logical address is associated with both an image identifier and a processing node identifier. This limits the number of system images which can share a channel to the capacity of the logical address field (e.g., up to 16 using today's ESCON definition). However, a practical limit based on channel utilization also exists.

Figures 2A, 2B:
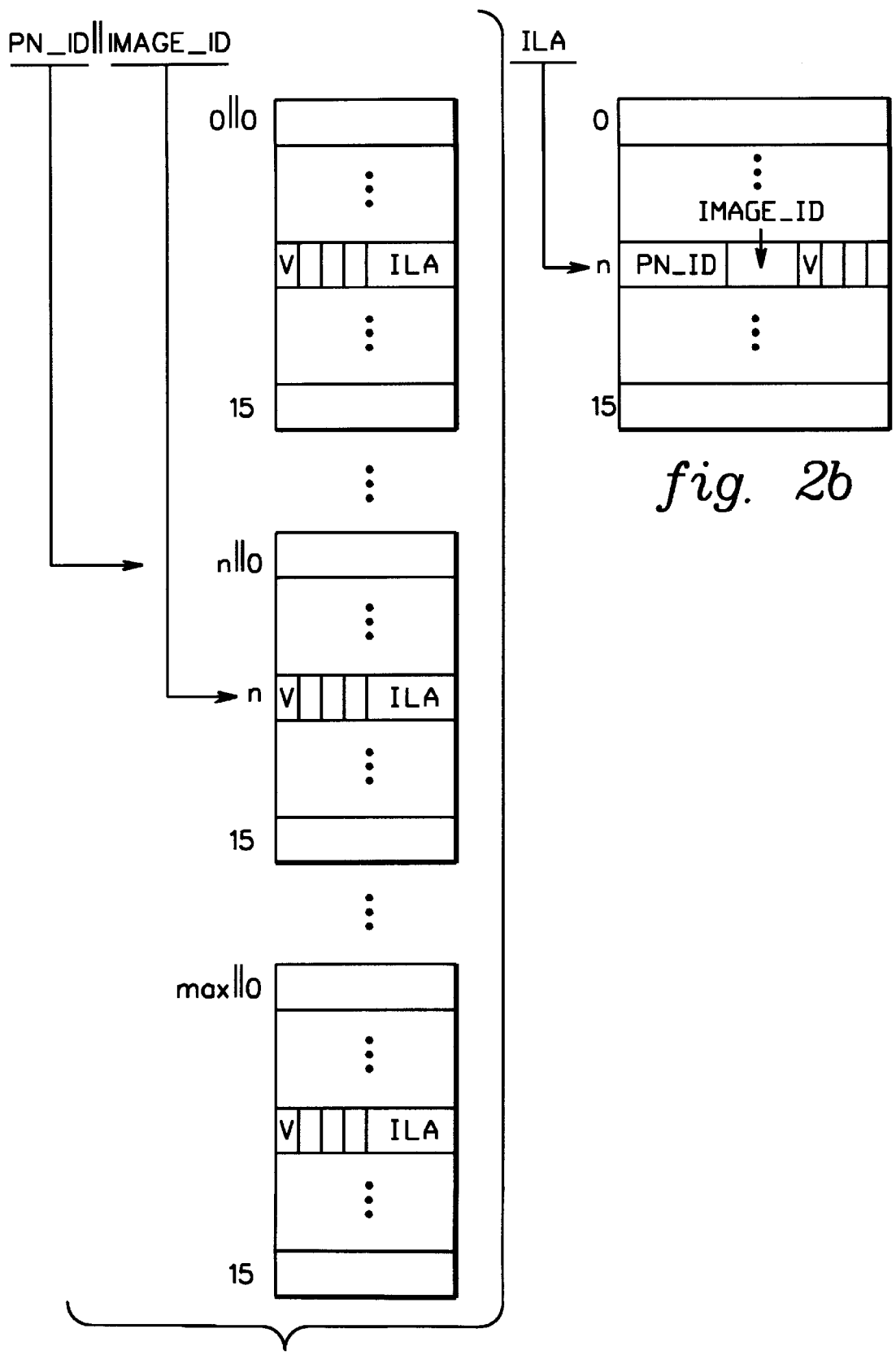

FIGS. 2a & 2b present one example of logical address tables in accordance with the present invention. These figures depict two lookup tables, one table (FIG. 2a) for transitioning from a PN_ID||Image_ID to an indexed logical address, and the other table (FIG. 2b) for reconverting from the indexed logical address to the corresponding PN_ID||Image_ID. These tables could either be generated on a per channel basis or on a per control unit basis. If generated on a per channel basis, it would save space, but would restrict the channel to only 16 valid PN_ID||Image_ID combinations at any one time. For the latter, the restriction would apply to the control unit, but the channel would be able to accommodate many more combinations depending upon the number of control units attached to the channel. It should be noted that in current S/390 practice, logical paths are long-lived. In particular, the paths are terminated only as a result of certain error conditions, shut down of the system image which caused them to be created, or shut down of the entire system. One reason that logical paths are long-lived is that the control unit manages state information concerning a logical path, which persists across more than one channel program.

The tables could be initialized in one of two ways. First, correspondence could be defined as part of the configuration information supplied by the customer. In this approach, the customer specifies the correspondence between the indexed logical address and the Image_ID||PN_ID for each channel or control unit as part of the system I/O configuration information. Each table is then filled with this information during the power on and initialization of the system complex. Alternatively, the correspondence could be created dynamically as already discussed herein. Again, dynamic creation occurs whenever a system image causes a logical path to be created (when a system image is activated or when it performs the first I/O operation on that path).

The table of FIG. 2a actually comprises a plurality of tables which are referred to herein as "component tables". A component table is provided for each possible processing node identifier (PN_ID). Thus, the maximum (max) number of these component tables is based on the number of physical processing nodes to be supported, and therefore, the size of the overall table can be optimized. In this embodiment, each component table contains 16 entries, one for each of the possible images within a physical processing node. Each entry in a component table is 1 byte wide and contains a validity indication (V) and, if valid, an indexed logical address (ILA).

When a channel program is initiated, the channel selects the appropriate component table by first multiplying the PN_ID by 16 (i.e., the size of the component table) and adding the result to the base address of the overall table. Subsequently, the channel uses the Image_ID to index into the component table to select the appropriate entry. If the validity bit (V) is on, the channel uses the indexed logical address (ILA) from the entry when communicating with the control unit. If, however, the validity bit is off, then the channel either rejects the request or dynamically assigns an available indexed logical address. The spare bits in the entry can be used for maintaining other state information not directly relevant to the present invention.

The table of FIG. 2b comprises a simple lookup table that contains 16 entries, one for every possible indexed logical address. The size of each entry is dependent on the number of physical processing nodes required for the system. Shown is a two-byte entry allowing for the four-bit Image_ID, a validity indication (V) and a one-byte PN_ID field allowing for up to 256 physical processing nodes to be coupled together in the computer system. When an unsolicited message arrives from the control unit, the indexed logical address is multiplied by 2 (size of the entry) and added to the base address of the table to select the entry. If the validity bit is on, the control unit information can be presented to the image within the physical processing node as indicated by the selected entry. If the corresponding validity bit is off, no logical path has been established with the control unit and the request is rejected. As with FIG. 2a, the spare bits in the entry can be used for maintaining other state information not directly relevant to the present invention.

As noted initially, the I/O processors (IOPs) can either reside within the distinct processing nodes (as in FIG. 1) or can be shared along with the channels between multiple processing nodes. FIG. 3 depicts one embodiment wherein the IOPs are shared. Sharing the I/O processors has the advantage of reducing the number of IOPs and also reducing the number of messages across the switch since control of the channels associated with each IOP is internal to that set of IOP/channels and does not involve switch crossings. Together, shared IOPs 30 and shared channel subsystem 16 comprise an I/O subsystem 32 shared by the different processing nodes 12' in the computer system 10'. Note that in this embodiment, all I/O processors are removed from the processing nodes. Further, all shared IOPs and channels are assumed to have global access to the subchannel control blocks, discussed below, of each processor in the coupled system.

Figure 4:
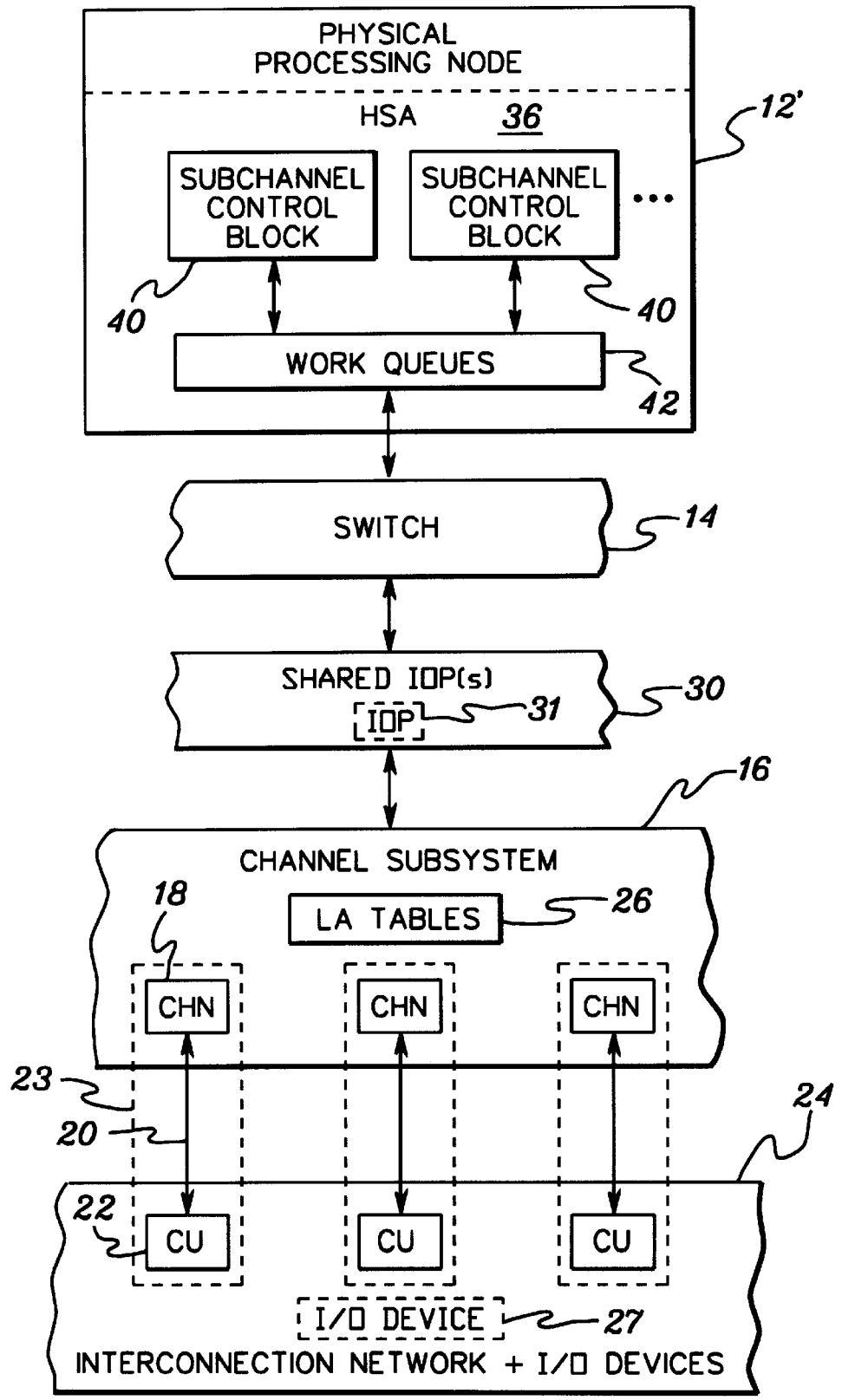
FIG. 4 depicts a more detailed block diagram of certain components of the computer system of FIG. 3.

FIG. 4 presents a more detailed diagram of certain components of the computer system of FIG. 3. In today's S/390 system, a hardware system area (HSA) 36 in each processing node 12' contains various system control information, including the subchannel control blocks 40 which manage I/O operations. A subchannel control block represents a particular I/O device 27 of the interconnection network and I/O devices 24 to which the computer system is coupled. A CPU (not shown) within the processing node initiates an I/O operation by putting the operation parameters into the subchannel control block representing the target I/O device 27 and then putting the subchannel control block on a work queue 42 associated with an IOP 31 of the shared IOPs 30. IOP 31 controls one or more channels 18 connected to the target I/O device 27.

The processor then issues a message to the IOP 31 to indicate that there is work in queue 42. The message may be issued for every I/O operation or only if the work queue was previously empty. The IOP and channels then access the subchannel control blocks in HSA 36 in order to perform the I/O operation. With this invention, all shared IOPs and channels must be able to access the subchannel control blocks associated with every processing node 12'. This global access may be enabled either by placing all subchannel control blocks in a physical shared storage pool, which is also connected to the switch, by making use of distributed shared storage techniques such as known in the art, or by using the processing node identifiers to direct a memory request. With distributed shared storage, the pool of subchannel control blocks appears to be logically part of a single storage pool in which each control block has a single address; however physically, part of the pool resides in the hardware system area of each processing node.

Figure 5:
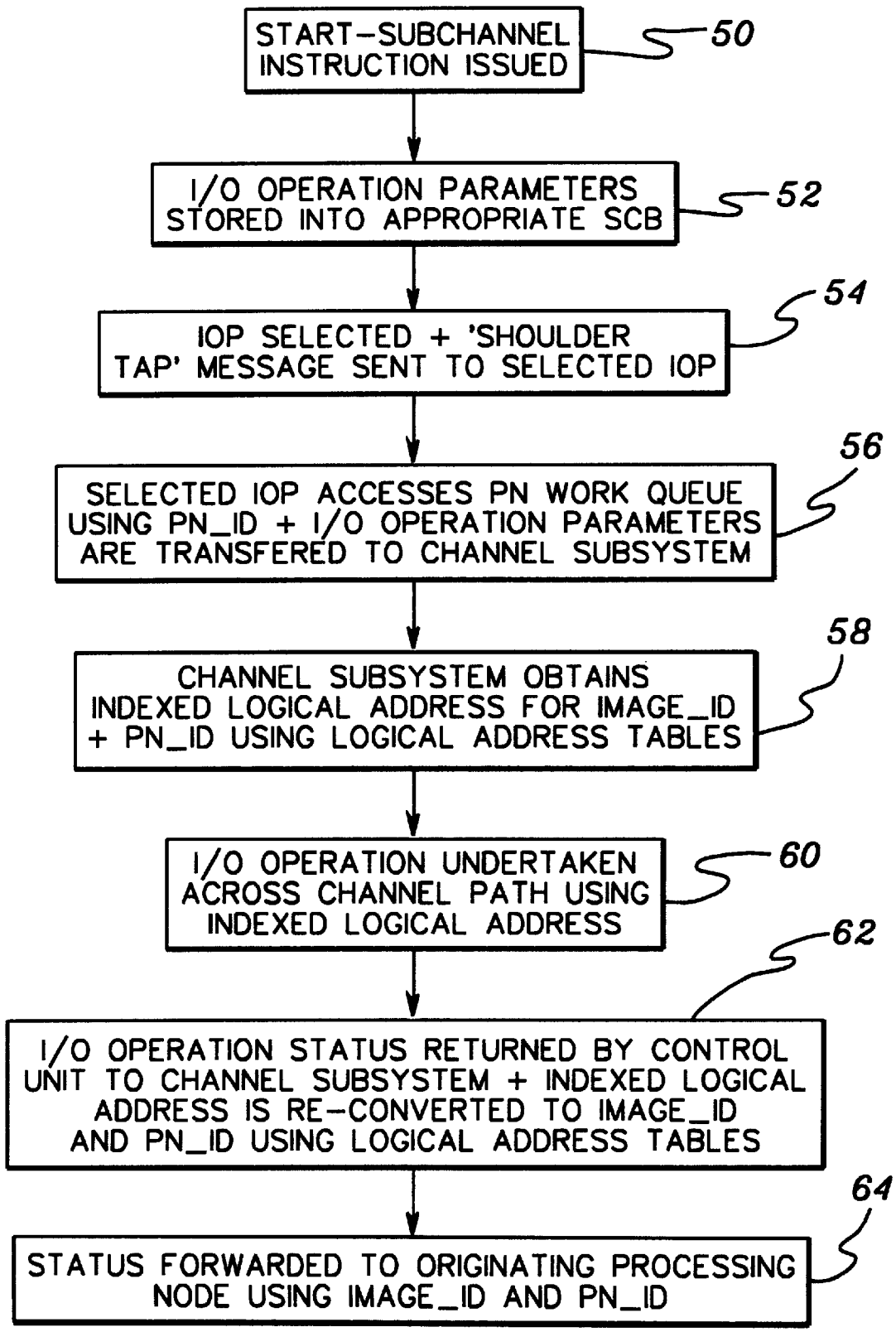
FIG. 5 depicts a flow diagram comprising one embodiment for sharing a channel between multiple physical processing nodes in accordance with the present invention.

Processing in accordance with the present invention is further discussed below with reference to the logic embodiments of FIGS. 5 & 6. FIG. 5 presents a first embodiment wherein an I/O operation is initiated by an application program issuing the normal START-SUBCHANNEL instruction 50. The START-SUBCHANNEL microcode stores the I/O operation parameters into the appropriate subchannel control block (SCB) 52. Assuming that the shared IOP architecture is employed, an IOP is next selected and the shoulder-tap message is sent through the switch to the selected IOP 54. Again, the present invention adds the PN_ID to the I/O operation parameters and to the information communicated in the shoulder-tap message. The IOPs use the PN_ID to determine which processing node's work queue to access for transfer of the I/O operation parameters to the channel subsystem 56. The channel uses the PN_ID to determine which processing node's main storage to access when fetching the channel program for an I/O operation and fetching/storing the data for the I/O operation. The IOP which undertakes the particular I/O operation employs messages across the switch to obtain the operation parameters from the subchannel control block associated with the initiating processing node. The IOP initiates the operation on one of its channels, the channel then uses messages across the switch to the memory of the initiating processing node to obtain the channel program and to transfer the data of the I/O operation.

In accordance with the invention, the channel subsystem first obtains an "indexed logical address" for the concatenated Image_ID and PN_ID using the logical address tables 58. The I/O operation is undertaken across the channel path using this indexed logical address 60. Again, the channel communicates with the I/O device using existing protocol, such as the ESCON protocol. Thus, the ESCON logical address, or indexed logical address, indirectly identifies the processing node, and the system image within the processing node which initiated the operation. At the end of the I/O operation, status is returned by the control unit to the channel subsystem, and the indexed logical address is reconverted to the Image ID and PN_ID using the logical address tables 62. The channel then places status information into the subchannel control block of the originating processing node and sends a message to the initiating processor indicating that the I/O operation is completed. This information is forwarded to the originating processor using the Image_ID and PN_ID obtained from re-converting the indexed logical address using the logical address tables 64.

Figure 6:
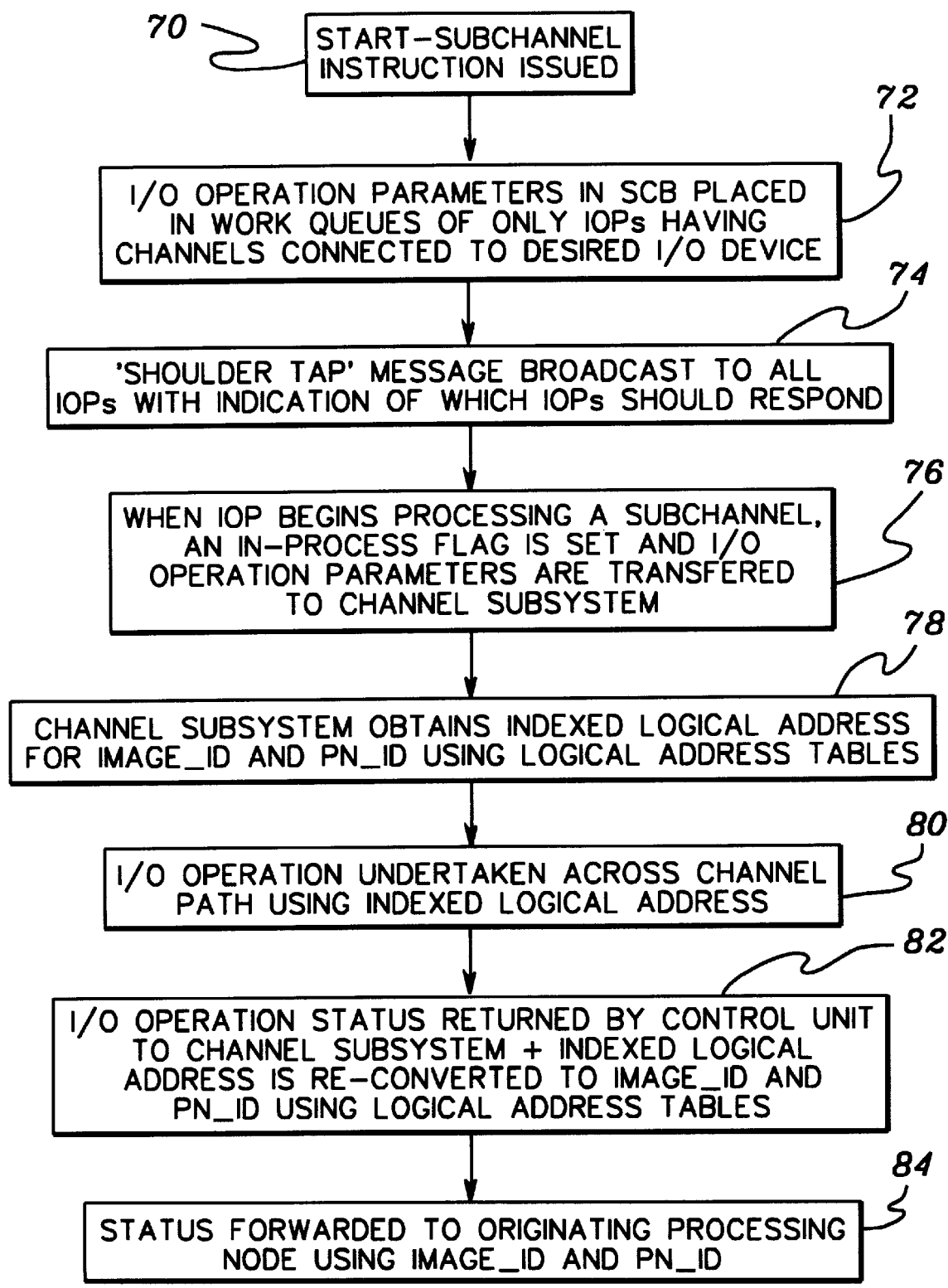
FIG. 6 depicts a flow diagram of an alternate embodiment of a method for sharing a channel between different physical processing nodes in accordance with the present invention.

FIG. 6 presents an alternate processing embodiment. In this approach, after issuing the normal START-SUBCHANNEL instruction 70 the I/O operation parameters in a subchannel control block are placed in work queues of only those I/O processors having channels connected to a desired I/O device 72. A shoulder-tap message is then broadcast to all IOPs 74. The shoulder-tap message can be sent to all shared IOPs attached to the switch. A processing node indicates in the shoulder-tap message which IOPs have channels connected to the target I/O device for the I/O operation. This enhances performance by reducing the number of messages sent across the switch and eliminates the need for IOPs which are not connected to a particular device to unnecessarily inspect the work queue. This can done as set forth below.

Each processing node contains a separate work queue for each IOP which is connected to devices used by that particular processing node. When the processing node processes a START-SUBCHANNEL instruction, it places the subchannel control block in the work queues of only the IOPs which have channels connected to the particular device. Placement of a subchannel in more than one work queue can be accomplished by any technique known in the art, such as implementing the work queue as a list of subchannel control block pointers rather than a linked list of the subchannel control blocks themselves. For a particular I/O operation, the set of applicable IOPs is determined from the path information in the subchannel control block, which must include, for each possible path to the device, the IOP identifier and the channel identifier within the input/output processor. Again, the shoulder-tap message which is broadcast to all the IOPs includes an indication of which IOPs should respond. One embodiment of this information is a bit map in which each bit represents a particular IOP and a setting of one indicates that the particular IOP should respond. When an IOP inspects the work queue, it removes from the work queue without processing them, subchannel control blocks which are already being processed by other IOPs. When it begins processing a subchannel, the IOP sets an in-process flag, which indicates to other IOPs that the subchannel control block is already being processed 76. Those skilled in the art will understand that a particular IOP is indicated in the shoulder-tap message only if the processor's work queue was previously empty, and the shoulder-tap is not sent if none of the applicable work queues were previously empty.

Processing then continues as in the flow of FIG. 5. Namely, the channel subsystem obtains an indexed logical address for the concatenated Image_ID and PN_ID using the logical address tables 78. The I/O operation is undertaken across a channel path using the indexed logical address 80. Upon completion, the I/O operation status is returned by the control unit to the channel subsystem where the indexed logical address is reconverted to the concatenated Image_ID and PN_ID, again employing the logical address tables 82. The I/O operations status is then forwarded to the originating processing node using the image and processing node identifiers 84.

To summarize, by sharing the I/O subsystem, and in particular the I/O processor and/or channel subsystem, the present invention achieves a reduction in the cost of connectivity by reducing excess paths previously required to couple multiple processing nodes to shared I/O devices. With this invention, each processing node may contain an I/O processor coupled to the shared I/O subsystem or the I/O processors may be connected between the switch of the coupled systems complex and the shared channels, thereby enabling the I/O processors to also be shared by the processing nodes. Full connectivity is attained using a smaller number of channels, control unit adapters and switches, while still meeting performance and availability objectives. Further advantages include a reduction in the size and number of switches required between the physical processing nodes and the shared I/O devices since a single switch may provide connectivity for any physical processing node to any channel of the shared subsystem.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. A computer system comprising:
    multiple physical processing nodes coupled together, each physical processing node having its own memory, at least one CPU and its own at least one operating system image; and
    at least one channel independent of and coupled to be shared by said multiple physical processing nodes, said at least one channel coupling said multiple physical processing nodes to at least one I/O device; and
    means for sharing the at least one channel between the multiple physical processing nodes such that a first I/O operation initiated at a first Physical processing node of the multiple physical processing nodes and a second I/O operation initiated at a second Physical processing node of the multiple physical processing nodes can each take place over said at least one channel; and
    wherein the at least one channel comprises multiple channels, said multiple channels comprising a channel subsystem which is coupled to and shared by said multiple physical processing nodes; and
    wherein said means for sharing includes means for providing the channel subsystem with an image identifier (Image_ID) and a processing node identifier (PN_ID) with initiation of the first I/O operation by the first physical processing node of the multiple physical processing nodes coupled to the channel subsystem.

2. The computer system of claim 1, wherein said channel subsystem includes at least one logical address table for conversion of the Image_ID and PN_ID from said physical processing node to an associated "indexed logical address" for use in communicating the I/O operation across a channel of said multiple channels comprising the channel subsystem.

3. The computer system of claim 2, wherein the indexed logical address comprises less bits than a number of bits required for the associated Image_ID and PN_ID.

4. The computer system of claim 2, wherein each physical processing node of the plurality of physical processing nodes has at least one I/O processor, and wherein each I/O processor communicates with at least one I/O device across the channel subsystem.

5. The computer system of claim 3, wherein said at least one logical address table includes a conversion table for converting the Image_ID and a PN_ID received from the physical processing node of said multiple physical processing nodes originating the I/O operation to the indexed logical address for transmission over the channel of said multiple channels, and a reconversion table for reconverting the indexed logical address to the associated Image_ID and PN_ID for return of I/O operation status to the physical processing node originating the I/O operation.

6. The computer system of claim 1, further comprising a switch coupling the multiple physical processing nodes to the at least one channel.

7. The computer system of claim 6, wherein each physical processing node of said multiple physical processing nodes comprises a central electronic complex (CEC) and wherein said CECs and said switch comprises a CECPLEX.

8. The computer system of claim 6, further comprising at least one shared I/O processor and means for sharing said at least one shared I/O processor between said multiple physical processing nodes, said at least one shared I/O processor being coupled between said switch and said at least one channel, said means for sharing comprising means for providing to the at least one shared I/O processor an image identifier (Image_ID) and a processing node identifier (PN_ID) with initiation of the first I/O operation at the first physical processing node of said multiple physical processing nodes.

9. The computer system of claim 8, wherein said at least one I/O device coupled to said at least one channel comprises a plurality of I/O devices coupled to said at least one channel, and wherein said at least one shared I/O processor comprises multiple shared I/O processors, at least some I/O processors of said multiple shared I/O processors being coupled to communicate across said at least one channel with at least one common I/O device of said plurality of I/O devices coupled to said at least one channel.

10. The computer system of claim 9, further comprising means for allowing only said at least some I/O processors of said multiple shared I/O processors to respond to the I/O operation initiation at the physical processing node of said multiple physical processing nodes when said I/O operation requires said at least one common I/O device of the plurality of I/O devices coupled to the at least one channel.

11. The computer system of claim 1, wherein each physical processing node of said multiple physical processing nodes comprises a central electronic complex (CEC).

12. The computer system of claim 1, wherein at least one physical processing node of said multiple physical processing nodes comprises a multiprocessor having multiple CPUs.

13. A computer system comprising:
    multiple physical processing nodes coupled together, each physical processing node characterized as having its own memory, at least one CPU and its own at least one operating system image and lacking its own I/O processor; and
    at least one input/output (I/O) processor independent of and coupled to be shared by said multiple physical processing nodes, said at least one I/O processor coupling said multiple physical processing nodes to at least one I/O device; and having
    means for sharing the at least one I/O processor between the multiple physical processing nodes such that a first I/O operation initiated at a first physical processing node of the multiple physical processing nodes and a second I/O operation initiated at a second physical processing node of the multiple physical processing nodes can each be processed through said at least one I/O processor; and
    wherein said at least one shared I/O processor comprises part of a shared I/O subsystem, said shared I/O subsystem further including a shared channel subsystem coupled between said at least one I/O processor and said at least one I/O device; and
    wherein said means for sharing further comprises means for sharing said shared channel subsystem, said means for sharing including means for providing the shared channel subsystem with an image identifier (Image_ID) and a processing node identifier (PN_ID) with initiation of an I/O operation at a physical processing node of said multiple physical processing nodes, and wherein said shared channel subsystem includes means for converting the Image_ID and PN_ID to an "indexed logical address" employing at least one logical address table, said indexed logical address being employed to communicate the I/O operation across a channel of said shared channel subsystem.

14. The computer system of claim 13, wherein the indexed logical address comprises less bits than a number of bits required for the Image_ID and PN_ID, said number of bits required for the Image_ID and PN_ID being incapable of direct transfer across said channel of said shared channel subsystem.

15. The computer system of claim 14, wherein said at least one logical address table comprises a conversion logical address table and a reconversion logical address table, said conversion logical address table being employed by said means for converting the Image_ID and PN_ID to the indexed logical address, and wherein said shared channel subsystem further comprises means for reconverting the indexed logical address to the associated Image_ID and PN_ID, said means for reconverting employing said reconversion logical address table to reconvert the indexed logical address to the Image_ID and PN_ID for communication back to the physical processing node originating the I/O operation.

16. The computer system of claim 13, wherein each physical processing node of said multiple physical processing nodes comprises a central electronic complex (CEC) and wherein said CECs and said switch comprise a CECPLEX.

17. The computer system of claim 13, further comprising at least one channel coupled between said at least one shared I/O processor and said at least one I/O device, said at least one channel being shared by said multiple physical processing nodes coupled to said at least one shared I/O processor.

18. The computer system of claim 13, wherein each physical processing node of said multiple physical processing nodes comprises a central electronic complex (CEC).

19. The computer system of claim 13, wherein at least one physical processing node of said multiple physical processing nodes comprises a multiprocessor having multiple CPUs.

20. A method for processing input/output (I/O) operations within a computer system comprising a plurality of physical processing nodes coupled together and communicating with at least one I/O device via at least one shared channel, each physical processing node being characterized as having its own memory, at least one CPU and its own at least one operating system image and lacking its own channel subsystem, said at least one shared channel being independent of said plurality of physical processing nodes, said method comprising:

initiating a first I/O operation at a first processing node of said plurality of physical processing nodes, and initiating a second I/O operation at a second processing node of said plurality of physical processing nodes; and communicating the first I/O operation over the at least one shared channel and communicating the second I/O operation over the at least one shared channel, wherein said first I/O operation and said second I/O operation are each performed employing said at least one shared channel; and wherein initiating of the first I/O operation comprises providing an image identifier (Image_ID) and a processing node identifier (PN_ID) to a shared channel subsystem containing the at least one shared channel, and wherein said communicating comprises converting the Image_ID and PN_ID to an indexed logical address containing less bits than said Image_ID and PN_ID and using said indexed logical address to communicate the first I/O operation over said at least one shared channel.

21. The method of claim 20, wherein each said converting comprises employing a logical address table within the shared channel subsystem to obtain the indexed logical address.

22. The method of claim 21, further comprising, for each I/O operation, communicating I/O operation status from said at least one shared channel back to the physical processing node originating the I/O operation, said I/O operation status communicating including reconverting the indexed logical address back to the Image_ID and PN_ID for transmission of said I/O operation status to said physical processing node originating the I/O operation.

23. The method of claim 20, wherein said computer system further comprises at least one shared I/O processor coupled between said plurality of physical processing nodes and said at least one shared channel, and wherein said method comprises employing said at least one shared I/O processor to process said first I/O operation and said second I/O operation.

24. The method of claim 20, wherein each physical processing node of said multiple physical processing nodes comprises a central electronic complex (CEC).

25. A method for processing input/output (I/O) operations within a computer system comprising a plurality of physical processing nodes coupled together and communicating with at least one I/O device via at least one shared I/O processor, each physical processing node characterized as having its own memory, at least one CPU and its own at least one operating system image and lacking its own I/O processor, said at least one shared I/O processor being independent of said plurality of physical processing nodes, said method comprising:

initiating a first I/O operation at a first processing node of said plurality of physical processing nodes, and initiating a second I/O operation at a second processing node of said plurality of physical processing nodes; and processing the first I/O operation employing said at least one shared I/O processor and processing the second I/O operation employing said at least one shared I/O processor, wherein said first I/O operation and said second I/O operation are each processed by said at least one shared I/O processor; and wherein said computer system includes a shared channel subsystem coupled between said at least one shared I/O processor and said at least one I/O device, and wherein said method further comprises accomplishing the first I/O operation employing the shared channel subsystem and accomplishing the second I/O operation employing the shared channel subsystem; and wherein said initiating of the first I/O operation and said initiating of the second I/O operation each comprises providing an image identifier (Image_ID) and a processing node identifier (PN_ID) to the at least one shared I/O processor, and wherein said accomplishing each comprises converting the Image_ID and PN_ID to an "indexed logical address" using a logical address table in the shared channel subsystem and employing said indexed logical address to communicate the I/O operation across a channel of the shared channel subsystem coupled to the at least one I/O device, said indexed logical address having less bits than a concatenation of said Image_ID and said PN_ID.

26. The method of claim 25, wherein said computer system includes a switch, said switch being coupled between said plurality of physical processing nodes and said at least one shared I/O processor, and wherein said method further comprises communicating said first I/O operation and said second I/O operation to said at least one shared I/O processor across said switch.

27. The method of claim 26, wherein said first processing node contains at least one work queue and said second processing node contains at least one work queue, and wherein said communicating of said first I/O operation and said communicating of said second I/O operation across said switch to said at least one shared I/O processor comprise access the at least one work queue of the first processing node to transfer parameters of the first I/O operation to the at least one shared I/O processor and accessing the at least one work queue of the second processing node to transfer parameters of the second I/O operation to the at least one shared I/O processor.

28. The method of claim 27, wherein said computer system further comprises a shared channel subsystem coupling the at least one shared I/0 processor to the at least one I/O device, and wherein said method further comprises employing said at least one shared I/O processor to transfer commands associated with said first I/O operation from said at least one work queue of said first processing node to said shared channel subsystem and to transfer commands associated with said second I/O operation from said at least one work queue of said second processing node to said shared channel subsystem.

29. The method of claim 25, wherein each physical processing node of said multiple physical processing nodes comprises a central electronic complex (CEC).

\* \* \* \* \*